(12) United States Patent
Lee et al.

(10) Patent No.: US 12,504,794 B2
(45) Date of Patent: Dec. 23, 2025

(54) STRESS-FREE FOLDING MECHANISM

(71) Applicant: FlexiGO INC., Cheonan-si (KR)

(72) Inventors: Ki Yong Lee, Cheonan-si (KR); Seong Woo Kim, Cheonan-si (KR)

(73) Assignee: FlexiGO INC., Cheonan-si (KR)

( * ) Notice: Subject to any disclaimer, the term of this patent is extended or adjusted under 35 U.S.C. 154(b) by 0 days.

(21) Appl. No.: 18/785,908

(22) Filed: Jul. 26, 2024

(65) Prior Publication Data

US 2025/0199589 A1  Jun. 19, 2025

(51) Int. Cl.
*G06F 1/16* (2006.01)
*G01M 11/08* (2006.01)

(52) U.S. Cl.
CPC ........... *G06F 1/1681* (2013.01); *G01M 11/08* (2013.01); *G06F 1/1652* (2013.01)

(58) Field of Classification Search
CPC . G01M 11/08; G01N 3/20; G01N 2203/0023; G01N 2203/0028; G01N 2203/0435; G01N 2203/0447; G06F 1/1309
See application file for complete search history.

(56) References Cited

U.S. PATENT DOCUMENTS

| | | | | |
|---|---|---|---|---|
| 10,094,752 B2* | 10/2018 | Okazaki | | G01N 3/20 |
| 10,557,781 B2* | 2/2020 | Han | | G01M 99/007 |
| 10,962,456 B2* | 3/2021 | Han | | F16M 13/005 |
| 11,047,783 B2* | 6/2021 | Lee | | G01N 3/04 |
| 11,181,452 B2* | 11/2021 | Lee | | G01N 3/02 |
| 11,224,137 B2* | 1/2022 | Hsu | | E05D 11/0081 |
| 11,435,785 B2* | 9/2022 | Song | | G06F 1/1652 |
| 11,550,367 B2* | 1/2023 | Lin | | G06F 1/1681 |
| 11,740,164 B2* | 8/2023 | Kim | | G01N 3/02 73/849 |
| 11,761,867 B2* | 9/2023 | Joyce | | G01N 3/34 73/854 |
| 11,885,773 B2* | 1/2024 | Levesque | | G01N 3/20 |
| 12,000,803 B2* | 6/2024 | Levesque | | G01N 3/066 |
| 12,019,054 B2* | 6/2024 | Lee | | G01N 3/02 |
| 12,078,575 B2* | 9/2024 | Levesque | | G01M 99/008 |
| 12,111,294 B2* | 10/2024 | Lee | | G01N 3/20 |
| 12,146,865 B2* | 11/2024 | Lee | | G01N 3/20 |

(Continued)

FOREIGN PATENT DOCUMENTS

| KR | 10-2015-0139135 A | 12/2014 |
|---|---|---|
| KR | 10-1843874 B1 | 3/2018 |

(Continued)

OTHER PUBLICATIONS

English Translation of KR 102053319 (Year: 2023).*

*Primary Examiner* — Tran M. Tran
(74) *Attorney, Agent, or Firm* — United One Law Group LLC; Kongsik Kim; Jhongwoo Peck

(57) ABSTRACT

A stress-free folding mechanism includes a base module, and a folding module rotatably coupled to the base module to implement a folding action of a flexible material, and to which the flexible material is coupled. The folding module includes a folding main body disposed spaced apart from the base module, a rotational drive member, a first end of which is rotatably coupled to the base module and a second end of which is rotatably coupled to the folding main body, and an interlocking member slidably coupled to the folding main body via a sliding member.

14 Claims, 12 Drawing Sheets

(56) References Cited

U.S. PATENT DOCUMENTS

| | | | |
|---|---|---|---|
| 12,203,903 B2 * | 1/2025 | Joyce | G01N 3/04 |
| 12,342,481 B2 * | 6/2025 | Kim | H05K 5/0217 |
| 2019/0154555 A1 | 5/2019 | Han et al. | |
| 2019/0293535 A1 * | 9/2019 | Lee | G01N 3/02 |
| 2019/0391058 A1 * | 12/2019 | Lee | G01N 3/04 |
| 2020/0032952 A1 * | 1/2020 | Han | G01M 5/005 |
| 2020/0400541 A1 * | 12/2020 | Levesque | G01N 3/066 |
| 2021/0018412 A1 | 1/2021 | Levesque et al. | |
| 2021/0081005 A1 * | 3/2021 | Huang | G06F 1/1618 |
| 2022/0042891 A1 * | 2/2022 | Lee | G01N 3/20 |
| 2023/0236098 A1 * | 7/2023 | Lee | G01N 3/20 |
| 2023/0358653 A1 * | 11/2023 | Lee | G06F 1/1641 |
| 2023/0393043 A1 * | 12/2023 | Han | G01M 99/007 |
| 2024/0134419 A1 * | 4/2024 | Ha | G06F 1/1616 |
| 2024/0240932 A1 * | 7/2024 | Feng | G01B 11/02 |
| 2024/0361204 A1 * | 10/2024 | Lee | G01M 5/005 |

FOREIGN PATENT DOCUMENTS

| | | | |
|---|---|---|---|
| KR | 10-2019-0112238 A | | 10/2019 |
| KR | 102053319 B1 * | | 12/2019 |
| KR | 10-2255147 B1 | | 5/2021 |
| KR | 10-2021-0116037 A | | 9/2021 |
| KR | 10-2023-0115858 A | | 8/2023 |
| WO | 2022/143478 A1 | | 7/2022 |

\* cited by examiner (a)

(b)

"A"

(a)

(b)

1

STRESS-FREE FOLDING MECHANISM

CROSS REFERENCE TO RELATED APPLICATION

The present application claims priority from Korean Application No. 10-2023-0184515, filed Dec. 18, 2023, which is incorporated herein by reference in its entirety.

BACKGROUND

1. Technical Field

The present disclosure relates to a stress-free folding mechanism and, more particularly, to a stress-free folding mechanism that minimizes stress acting on a flexible material being folded or prevents stress from acting on a flexible material being folded in conducting a folding endurance test of flexible materials.

2. Description of the Related Art

In general, traditional display panels used for displays of televisions, computer monitors, and various portable electronic devices are constructed of inflexible glass substrates, and thus the display panels have a flat structure, are monotonous, and have limitations in their application.

With the advancement of science and technology, so-called flexible display devices that can be bent have been developed and produced recently by using flexible materials such as plastic instead of inflexible glass substrates. For example, technology is being developed for flexible display panels that can be folded or rolled up like a scroll.

As products with folding flexible displays are released, there is a need for technology to minimize stress on a folded flexible display or prevent stress from acting on a folded flexible display in conducting a folding endurance test of flexible displays.

DOCUMENT OF RELATED ART (Patent Document 1) Korean Patent No. 10-2255147, "360 DEGREE BI-DIRECTIONAL FOLDING DURABILITY EVALUATION DEVICE OF FLEXIBLE MATERIALS" (Announced May 24, 2021)

SUMMARY

Accordingly, the present disclosure has been made keeping in mind the above problems occurring in the related art, and the present disclosure is intended to provide a stress-free folding mechanism that minimizes stress acting on a flexible material being folded or prevents stress from acting on a flexible material being folded in conducting a folding endurance test of flexible materials.

In order to achieve the above objective, according to a preferred embodiment of the present disclosure, there is provided a stress-free folding mechanism including: a base module; and a folding module rotatably coupled to the base module to implement a folding action of a flexible material, and to which the flexible material is coupled, wherein the folding module may include: a folding main body disposed spaced apart from the base module; a rotational drive member, a first end of which is rotatably coupled to the base module and a second end of which is rotatably coupled to the folding main body; and an interlocking member slidably coupled to the folding main body via a sliding member.

As a result, when conducting a folding endurance test of flexible materials, it is possible to minimize stress acting on a flexible material being folded or prevent stress from acting on a flexible material being folded. In addition, the folding action of a flexible material may be clearly implemented. In addition, when implementing the folding action of a flexible material, a sliding method and a rotating method are used in parallel, so that the movement trajectory of the folding main body 21 and the movement trajectory of the interlocking member 24 create a smooth curved trajectory, preventing stress from occurring in the flexible material.

In this case, the rotational drive member may include: a folding bracket; a folding mounting module that rotatably couples a first end of the folding bracket and the base module; and a rotational mounting module that rotatably couples a second end of the folding bracket and the folding main body.

As a result, by smoothing the rotational movement of a folding bracket based on a base module and smoothing the rotational movement of the folding main body based on the folding bracket, a curved trajectory may be created stably.

In this case, the base module may be provided with a folding support bracket, and the folding mounting module may include: a folding hole portion provided in one of the first end of the folding bracket and the folding support bracket; a folding shaft portion coupled to the remaining one of the first end of the folding bracket and the folding support bracket; and a folding bearing fit-coupled to the folding hole portion and rotatably coupled to the folding shaft.

As a result, the rotational movement of the folding bracket may be clearly implemented based on the base module.

In this case, the rotational mounting module may include: a rotational hole portion provided in one of the second end of the folding bracket and the folding main body; a rotational shaft portion coupled to the remaining one of the second end of the folding bracket and the folding main body via a rotational bracket; and a rotational bearing fit-coupled to the rotational hole portion and rotatably coupled to the rotational shaft portion.

As a result, the rotational movement of the folding main body may be clearly implemented based on the folding bracket.

In this case, the sliding member may include: an interlocking guide coupled to one of the folding main body and the interlocking member to form a slide movement path of the interlocking member based on the folding main body; and a plurality of interlocking sliders coupled to the remaining one of the folding main body and the interlocking member so as to be slidably coupled to the interlocking guide.

As a result, the slide movement of the interlocking member may be performed smoothly based on the folding main body.

In addition, the sliding member may further include: an interlocking bracket coupled to the remaining one of the folding main body and the interlocking member, and to which the plurality of interlocking sliders is coupled.

As a result, by modularizing multiple interlocking sliders, the slide movement of the interlocking member may be clearly performed based on the folding main body and the clearance due to slide movement may be minimized.

The stress-free folding mechanism according to the preferred embodiment of the present disclosure may further include a jig module coupled to the folding module while coupled to the base module so that the flexible material is mounted.

As a result, it is easy to install a flexible material and the folding action of the flexible material may be clearly implemented.

The stress-free folding mechanism according to the preferred embodiment of the present disclosure may further include a jig detachment module that attaches and detachably couples the jig module to the base module.

As a result, the jig module may be replaced in various ways depending on the type of flexible material or test type. In addition, the jig module may be easily attached to and detached from the base module.

In this case, the jig module may be provided with a fixing jig coupling portion, and the jig detachment module may include: a detachable base provided with a member positioning portion where the fixing jig coupling portion is correctly positioned; and a base detachment member that detachably couples the detachable base to the base module.

As a result, the jig module may be positioned correctly on the base module.

In this case, the jig module may include: a fixing member coupled to the base module so that a first side of the flexible material is supported; a folding member disposed spaced apart from the fixing member and coupled to the folding module so that a second side of the flexible material is supported; and a rotation support member connecting mutually adjacent ends of the fixing members and the folding member.

As a result, the jig module may be stably combined with the base module and the folding module, the folding action of a flexible material may be clearly implemented according to the operation of the folding module, and stress acting on the flexible material may be suppressed or prevented.

In this case, the rotation support member may include: a fixing support shaft that forms a center of rotation of the rotation support member based on the fixing member; and a folding support shaft that is spaced apart from the fixing support shaft and that forms a center of rotation of the folding member based on the rotation support member, and the rotation support member rotates based on the fixing member in conjunction with the rotation of the folding member based on the rotation support member when the folding member is folded relative to the fixing member.

As a result, the linked operation of the fixing member, the folding member, and the rotation support member may be facilitated, and as the fixing member, the folding member, and the rotation support member rotate in conjunction with each other, stress acting on a flexible material may be suppressed or prevented.

In this case, the rotation support member may include: a mounting bracket disposed between the fixing member and the folding member; a fixing support member coupled to the fixing member and rotatably coupled to the mounting bracket via the fixing support shaft; and a folding support member coupled to the folding member and rotatably coupled to the mounting bracket via the folding support shaft, wherein the fixing support member and the folding support member may be gear-coupled with each other.

As a result, the linked rotation of the mounting bracket, the fixing support member, and the folding support member may be made clear, and when a flexible material is folded, stress may be suppressed or prevented from being applied to the flexible material.

In this case, the jig module may further include a rotary blade provided in a pair, so that the rotary blades may be spaced apart from each other to form symmetry, and rotatably coupled to the rotation support member.

As a result, when a flexible material is folded, the area where the flexible material is bent may be supported to form a water drop shape, and the flexible material may be protected by covering the area where the flexible material is bent. In addition, as the folding of a flexible material is completed, it is possible to ensure that parts of the flexible material facing each other are parallel and close to each other, and the thickness after folding is completed may be reduced. In addition, a bending trace may be minimized in the area where a flexible material is bent, and when a flexible material is unfolded, the flatness of the flexible material may be improved and the surface of the flexible material may be smoothed.

In this case, the rotary blades may each provided with an idle stopper that is caught and supported by the rotation support member in an idle state in which the flexible material is spread out.

As a result, when a flexible material is unfolded, the fixing member, the folding member, and the rotary blades may be arranged flat on the same plane, and the unfolded state of the flexible material may be maintained flat.

In this case, on a side of the fixing member facing the folding member, a fixing blade stopper may be provided to prevent rotation of the rotary blades as a folding of the flexible material is completed, and on a side of the folding member facing the fixing member, a folding blade stopper may be provided to prevent the rotation of the rotary blades as the folding of the flexible material is completed, wherein the fixing blade stopper and the folding blade stopper may be symmetrical to each other.

As a result, as the folding of a flexible material is completed, a water drop shape in the area where the flexible material is bent may be maintained stably and deformation of the area where the flexible material is bent may be prevented.

In this case, on a side of each of the rotary blades, a blade support portion may be provided to be supported by the fixing blade stopper or the folding blade stopper as the folding of the flexible material is completed.

As a result, as the folding of a flexible material is completed, a water drop shape in the area where the flexible material is bent may be maintained stably and deformation of the area where the flexible material is bent may be prevented.

In this case, a fixing positioning groove may be formed recessed in one of a side of the fixing member facing the folding member or the rotary blades, a folding positioning groove may be formed recessed in one of a side of the folding member facing the fixing member or the rotary blades, and in the remaining one of the side of the fixing member facing the folding member or the rotary blades, and in the remaining one of the side of the folding member facing the fixing member or the rotary blades, a blade positioning groove, which may be inserted into and removed from the fixing positioning groove or the folding positioning groove according to the folding action of the flexible material, may be protrudingly formed.

As a result, the individual movements of the fixing member, the folding member, and the rotary blade may be made clear, and the rotary blades may be correctly positioned between the fixing member and the folding member.

According to a stress-free folding mechanism of the preferred embodiment of the present disclosure, in conducting a folding endurance test of flexible materials, stress acting on a flexible material being folded can be minimized or stress can be prevented from being applied to a flexible material being folded. In addition, the folding action of a flexible material can be clearly implemented. In addition, when implementing the folding action of a flexible material, a sliding method and a rotating method are used in parallel, so that the movement trajectory of a folding main body and the movement trajectory of an interlocking member create a smooth curved trajectory, preventing stress from occurring in the flexible material.

Furthermore, according to the present disclosure, by smoothing the rotational movement of a folding bracket based on a base module and smoothing the rotational movement of the folding main body based on the folding bracket, a curved trajectory can be created stably.

Furthermore, according to the present disclosure, the rotational movement of the folding bracket can be clearly implemented based on the base module.

Furthermore, according to the present disclosure, the rotational movement of the folding main body can be clearly implemented based on the folding bracket.

Furthermore, according to the present disclosure, the slide movement of the interlocking member can be performed smoothly based on the folding main body. In addition, by modularizing multiple interlocking sliders, the slide movement of the interlocking member can be clearly performed based on the folding main body and the clearance due to slide movement can be minimized.

Furthermore, according to the present disclosure, it is easy to install a flexible material and the folding action of the flexible material can be clearly implemented.

Furthermore, according to the present disclosure, a jig module can be replaced in various ways depending on the type of flexible material or test type. In addition, the jig module can be easily attached to and detached from the base module.

Furthermore, according to the present disclosure, the jig module can be positioned correctly on the base module.

Furthermore, according to the present disclosure, the jig module can be stably combined with the base module and the folding module, the folding action of a flexible material can be clearly implemented according to the operation of the folding module, and stress acting on the flexible material can be suppressed or prevented.

Furthermore, according to the present disclosure, the linked operation of a fixing member, a folding member, and a rotation support member can be facilitated, and as the fixing member, the folding member, and the rotation support member rotate in conjunction with each other, stress acting on a flexible material can be suppressed or prevented.

Furthermore, according to the present disclosure, the linked rotation of a mounting bracket, a fixing support member, and a folding support member can be made clear, and when a flexible material is folded, stress can be suppressed or prevented from being applied to the flexible material.

Furthermore, according to the present disclosure, when a flexible material is folded, the area where the flexible material is bent can be supported to form a water drop shape, and the flexible material can be protected by covering the area where the flexible material is bent. In addition, as the folding of a flexible material is completed, it is possible to ensure that parts of the flexible material facing each other are parallel and close to each other, and the thickness after folding is completed can be reduced. In addition, a bending trace can be minimized in the area where a flexible material is bent, and when a flexible material is unfolded, the flatness of the flexible material can be improved and the surface of the flexible material can be smoothed.

Furthermore, according to the present disclosure, when a flexible material is spread out, the fixing member, the folding member, and rotary blades can be arranged flat on the same plane, and the unfolded state of the flexible material can be maintained flat.

Furthermore, according to the present disclosure, as the folding of a flexible material is completed, a water drop shape in the area where the flexible material is bent can be maintained stably and deformation of the area where the flexible material is bent can be prevented.

Furthermore, according to the present disclosure, the individual movements of the fixing member, the folding member, and the rotary blade can be made clear, and the rotary blades can be correctly positioned between the fixing member and the folding member.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
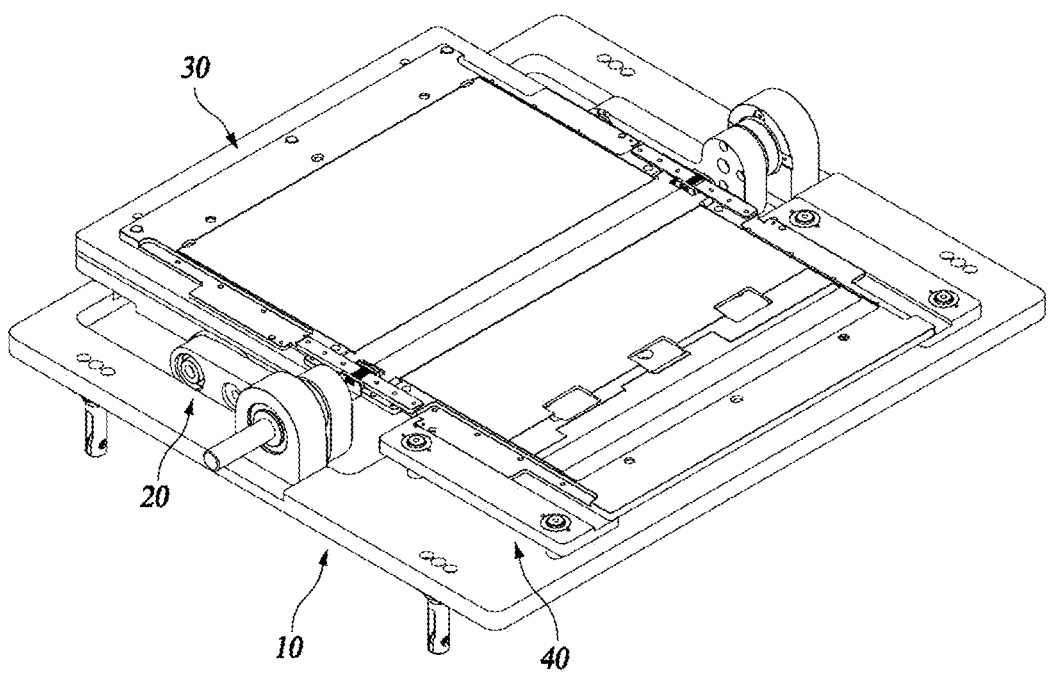
FIG. 1 is a perspective view showing a stress-free folding mechanism according to an embodiment of the present disclosure.
Figure 2:
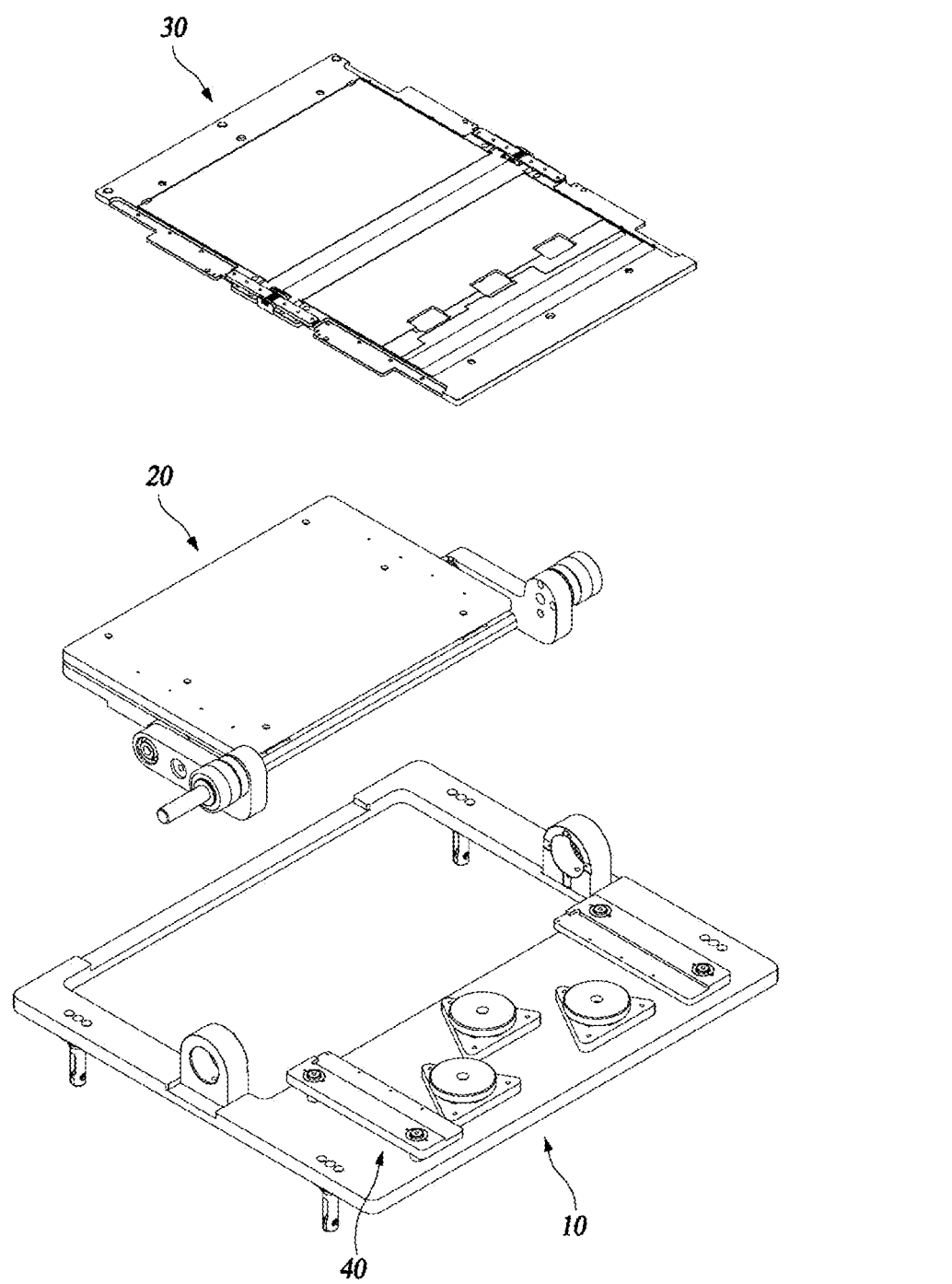
FIG. 2 is an exploded perspective view of FIG. 1.
Figure 3:
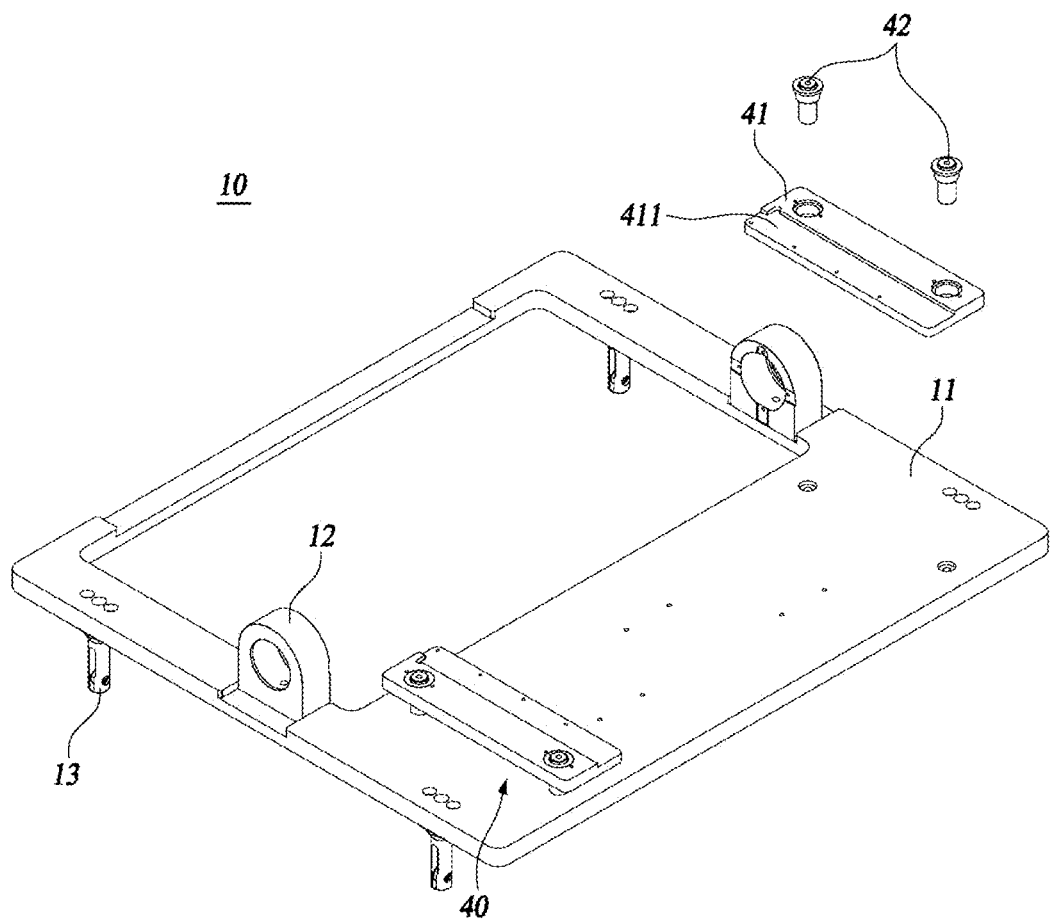
FIG. 3 is a perspective view showing a base module in a stress-free folding mechanism according to an embodiment of the present disclosure.
Figure 4:
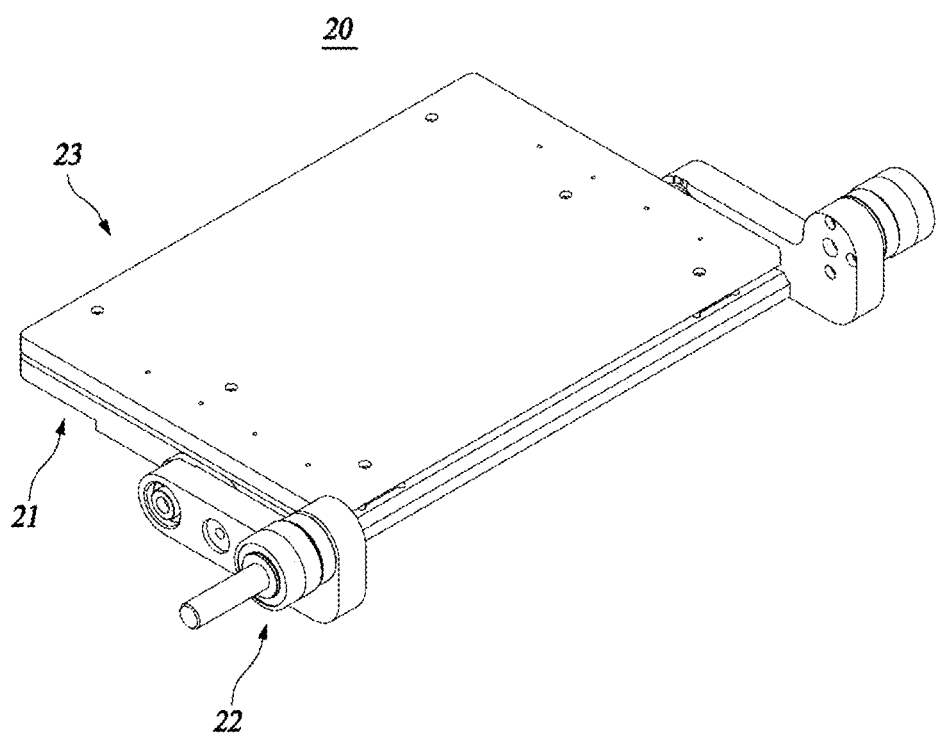
FIG. 4 is a perspective view showing a folding module in a stress-free folding mechanism according to an embodiment of the present disclosure.
Figure 5:
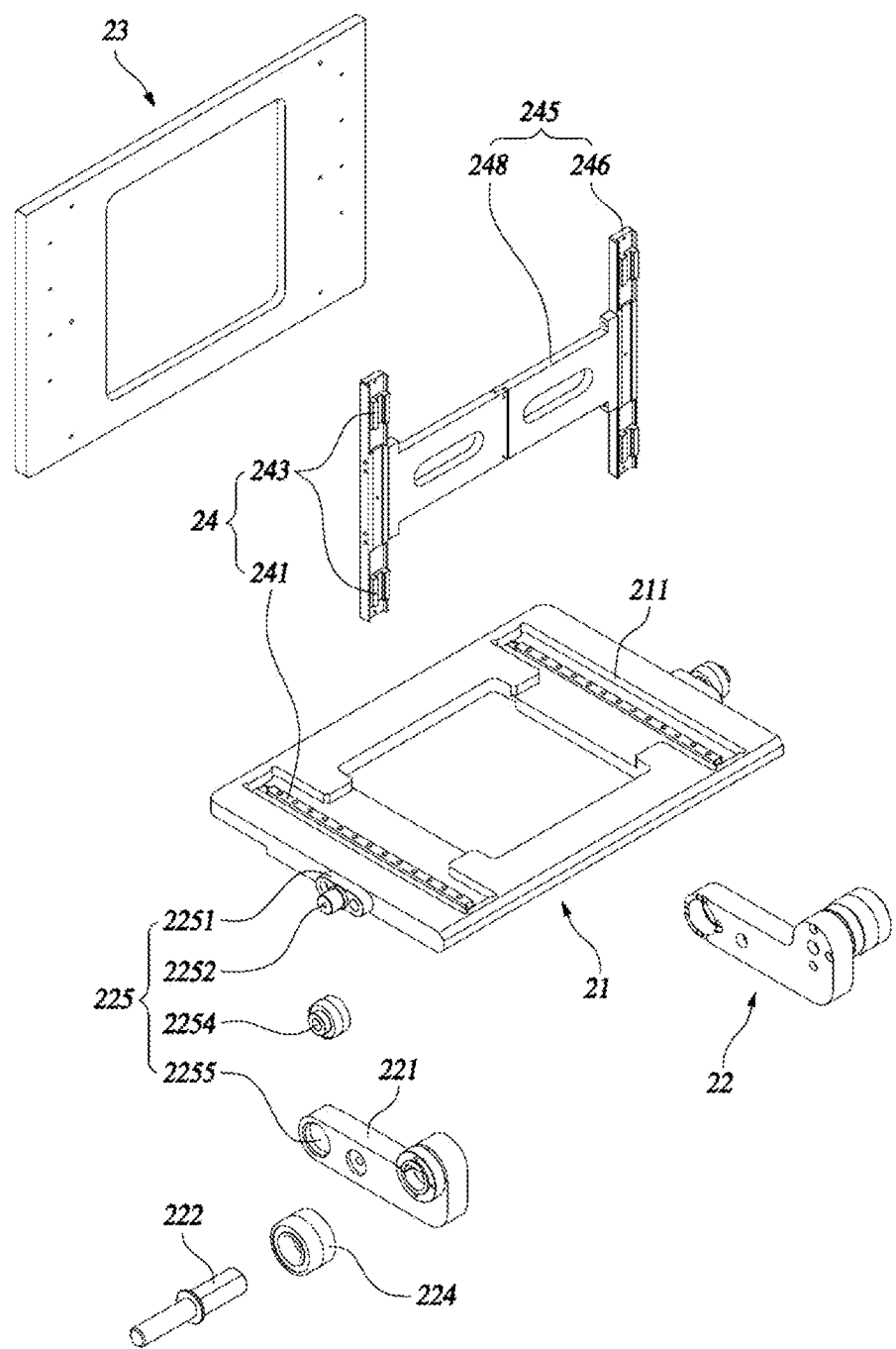
FIG. 5 is an exploded perspective view of FIG. 4.
Figure 6:
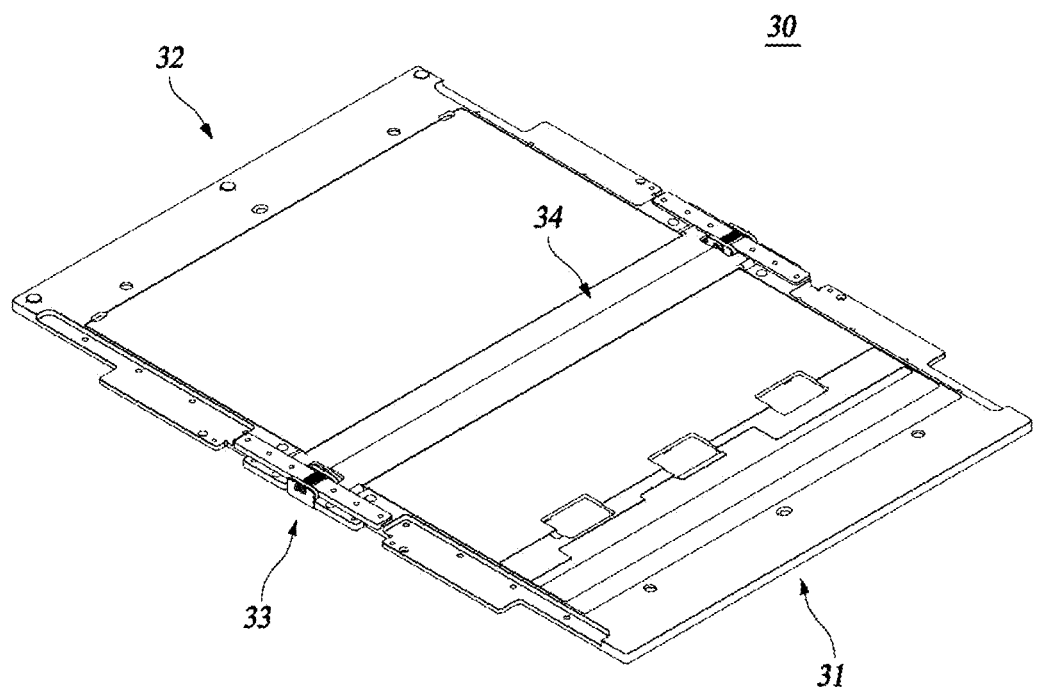
FIG. 6 is a perspective view showing a jig module in a stress-free folding mechanism according to an embodiment of the present disclosure.
Figure 7:
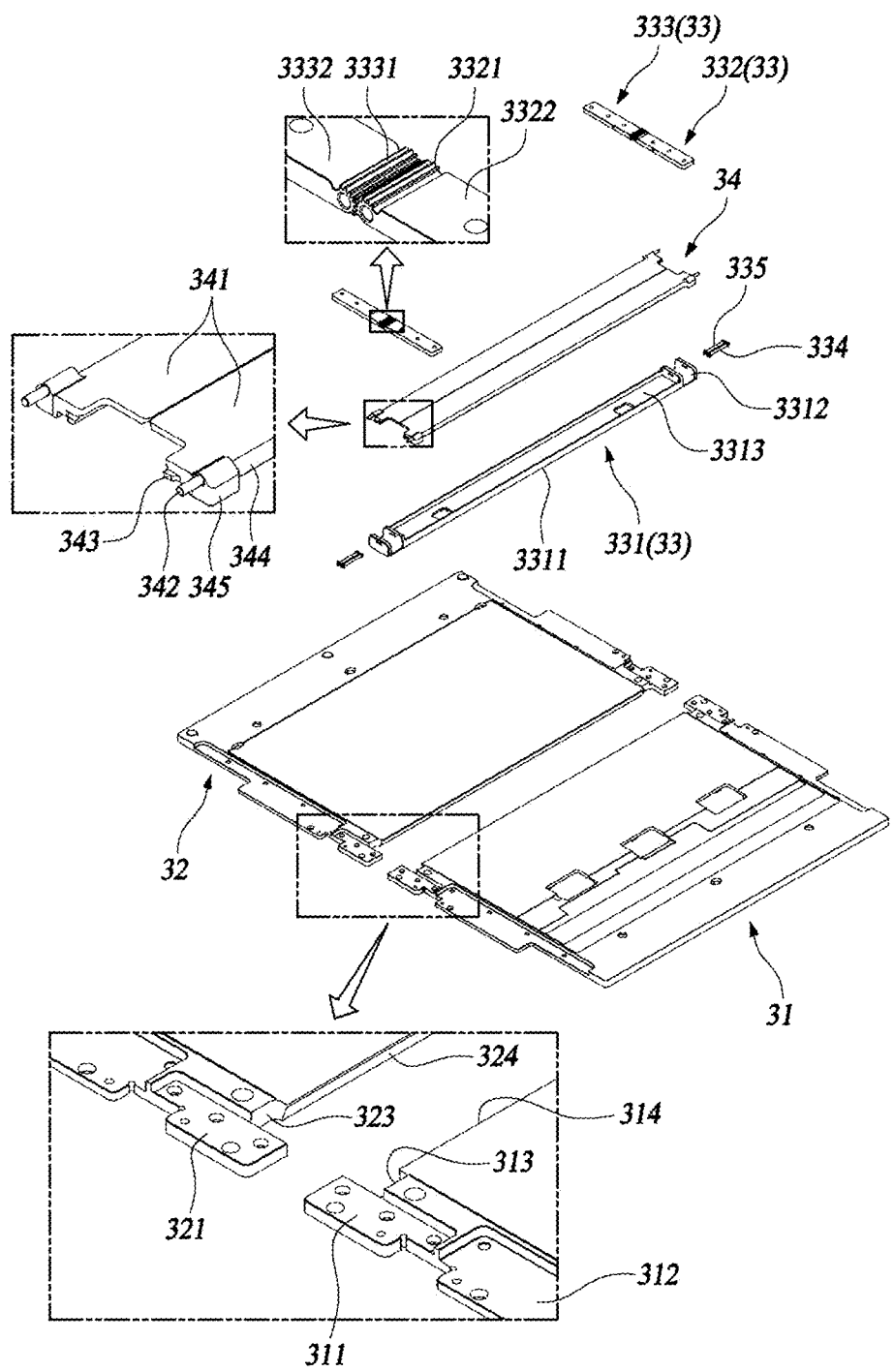
FIG. 7 is an exploded perspective view of FIG. 6.

The above objectives, other objectives, features and advantages of the present disclosure can be easily understood through the following preferred embodiments related to the attached drawings. However, the present disclosure is not limited to the embodiments described herein and may be embodied in other forms. Rather, the embodiments introduced herein are provided so that the present disclosure will be thorough and complete, and will fully convey the spirit of the present disclosure to those skilled in the art.

In this specification, when a component is referred to as being on another component, it means that it may be formed directly on the other component or that a third component may be interposed between them. Additionally, in the drawings, the thickness of components may be exaggerated for effective explanation of technical content.

When terms such as first, second, etc. are used in this specification to describe components, these components should not be limited by these terms. These terms are merely used to distinguish one component from another. The embodiments described and illustrated herein also include complementary embodiments thereof.

In addition, when it is said that a first element (or component) is operated or executed on a second element (or component), it should be understood that the first element (or component) operates or runs in an environment in which the second element (or component) operates or runs, or the second element (or component) operates or runs through direct or indirect interaction.

When any element, component, device or system is said to contain a component consisting of a program or software, it should be understood, even without explicit mention, that the element, component, device or system includes hardware (e.g., memory, CPU, etc.) necessary for the program or software to run or operate, or other programs or software (e.g., drivers required to run an operating system or the hardware, etc.).

In addition, when an element (or component) is implemented, unless otherwise specified, it should be understood that the element (or component) can be implemented in any form of software, hardware, or software and hardware.

In addition, the terminology used herein is for the purpose of describing the embodiments and is not intended to limit the present disclosure. In this specification, singular forms also include plural forms unless specifically stated in the phrase. As used in the specification, "comprises" and/or "comprising" does not exclude the presence or addition of one or more other components.

Below, although an embodiment of the present disclosure is described, those skilled in the art can make various modifications and changes to the present disclosure by adding, changing, or deleting components, etc., without departing from the spirit of the present disclosure as set forth in the patent claims, and this will also be included within the scope of the rights of the present disclosure.

Referring to FIGS. 1 to 12, a stress-free folding mechanism according to an embodiment of the present disclosure may include a base module 10 and a folding module 20.

The base module 10 is coupled to a system main body provided in a folding system that performs a folding test of flexible materials. One side of a flexible material is coupled to the base module 10 via a fixing member 31 of a jig module 30, which will be described later. The base module 10 may include: a plate-shaped base main body 11; and a folding support bracket 12 protruding from the base main body 11 so that the folding module 20 may be rotatably coupled. A body opening is formed through the base main body 11 to facilitate ventilation and heat dissipation according to the operation of the folding mechanism, and to minimize the load on the base main body 11. The folding support bracket 12 is provided in a pair on the base main body 11, so that the folding support brackets 12 face each other while being spaced apart from each other.

The base module 10 may further includes a base coupling member 13 protruding from the base main body 11 for coupling with the system main body.

The folding module 20 is rotatably coupled to the base module 10 to implement a folding action of the flexible material. The other side of the flexible material is coupled to the folding module 20 via a folding member 32 of the jig module 30, which will be described later.

The folding module 20 may include: a folding main body 21 disposed spaced apart from the base module 10; a rotational drive member 22, one end of which is rotatably coupled to the base module 10 and the other end of which is rotatably coupled to the folding main body 21; and an interlocking member 24 slidably coupled to the folding main body 21 via a sliding member 23.

The folding main body 21 has a flat plate shape, and it is desirable that a reciprocation mounting portion 211 to which the sliding member 23 is coupled is provided on the side of the folding main body 21 facing the interlocking member 24.

The rotational drive member 22 may include: a folding bracket 221; a folding mounting module that rotatably couples one end of the folding bracket 221 and the base module 10; and a rotational mounting module 225 that rotatably couples the other end of the folding bracket 221 and the folding main body 21.

The folding bracket 221 may be arranged in a pair, so that the folding brackets 221 face each other and are spaced apart from each other in response to the folding support brackets 12.

The folding mounting module may include: a folding hole portion provided in one of a first end of the folding bracket 221 and the folding support bracket 12; a folding shaft portion 222 coupled to the remaining one of the first end of the folding bracket 221 and the folding support brackets 12; a folding bearing 224 fit-coupled to the folding hole portion and rotatably coupled to the folding shaft portion 222.

The rotational mounting module 225 may include: a rotational hole portion 2255 provided in one of a second end of the folding bracket 221 and the folding main body 21; a rotational shaft portion 2252 coupled to the remaining one of the second end of the folding bracket 221 and the folding main body 21 via a rotational bracket 2251; and a rotational bearing 2254 fit-coupled to the rotational hole portion 2255 and rotatably coupled to the rotational shaft portion 2252.

The interlocking member 24 has a flat plate shape and is stacked and supported on the folding main body 21.

The sliding member 23 may include: an interlocking guide 241 coupled to one of the folding main body 21 and the interlocking member 24 to form a slide movement path of the interlocking member 24 based on the folding main body 21; and a plurality of interlocking sliders 243 coupled to the remaining one of the folding main body 21 and the interlocking member 24 so as to be slidably coupled to the interlocking guide 241.

The sliding member 23 may further include: an interlocking bracket 245 coupled to the remaining one of the folding main body 21 and the interlocking member 24, and to which the plurality of interlocking sliders 243 is coupled. The interlocking bracket 245 may include: a plurality of guide rods 246 coupled to the remaining one of the folding main body 21 and the interlocking member 24, and to which the plurality of interlocking sliders 243 is coupled so as to be parallel to the interlocking member 24; and a rod connection frame 248 that connects the guide rods 246 to each other.

Then, according to the folding action of the flexible material, the folding bracket 221 rotates based on the base module 10, the folding main body 21 rotates based on the folding bracket 221, and the interlocking member 24 slides and moves based on the folding main body 21, so that the sliding movement and the rotational movement are operated in conjunction with each other, and the folding operation of the jig module 30 may be clearly performed.

The stress-free folding mechanism according to an embodiment of the present disclosure may further include at least the jig module 30 among the jig module 30 and a jig detachment module 40. The jig module 30 is coupled to the folding module 20 while being coupled to the base module 10 so that the flexible material is mounted. In addition, the jig detachment module 40 attaches and detachably couples the jig module 30 to the base module 10. The jig detachment module 40 may include: a detachable base 41 provided with a member positioning portion 411 where a fixing jig coupling portion 312 of the jig module 30 is correctly positioned; and a base detachment member 42 that detachably couples the detachable base 41 to the base module 10.

The jig module 30 may include: the fixing member 31 coupled to the base module 10 so that one side of the flexible material is supported; the folding member 32 disposed apart from the fixing member 31 and coupled to the folding module 20 so that the other side of the flexible material is supported; and a rotation support member 33 connecting the mutually adjacent ends of the fixing member 31 and the folding member 32.

The fixing member 31 has a flat plate shape. Each end of the fixing member 31 may be provided with a fixing support coupling portion 311 to which a fixing support member 332 of the rotation support member 33 is coupled. Each end of the fixing member 31 may be provided with a fixing jig coupling portion 312 spaced apart from the fixing support coupling portion 311 to which the jig detachment module 40 is coupled. A fixing positioning groove 313 may be recessed at the end of the fixing member 31 facing the folding member 32. The side of the fixing member 31 facing the folding member 32 may be provided with a fixing blade stopper 314 that prevents the rotation of a rotary blade 34, which will be described later, as folding of the flexible material is completed.

The folding member 32 has a flat plate shape and is disposed to be spaced apart from the fixing member 31 on the same plane in the unfolded state where the flexible material is unfolded. Each end of the folding member 32 may be provided with a folding support coupling portion 321 to which a folding support member 333 of the rotation support member 33 is coupled. A folding positioning groove 323 may be recessed at the end of the folding member 32 facing the fixing member 31. A folding blade stopper 324 may be provided on the side of the folding member 32 facing the fixing member 31 to prevent the rotation of the rotary blade 34 as the folding of the flexible material is completed.

At this time, it is preferable that the fixing support coupling portion 311 and the folding support coupling portion 321 are symmetrical to each other. It is preferable that the fixing positioning groove 313 and the folding positioning groove 323 are symmetrical to each other. In addition, it is preferable that the fixing blade stopper 314 and the folding blade stopper 324 are symmetrical to each other.

The rotation support member 33 may include: a fixing support shaft 334 that forms the center of rotation of the rotation support member 33 based on the fixing member 31; and a folding support shaft 335 that is disposed spaced apart from the fixing support shaft 334 and forms the center of rotation of the folding member 32 based on the rotation support member 33. Then, when the folding member 32 is folded based on the fixing member 31, the rotation support member 33 is preferably rotated with respect to the fixing member 31 in conjunction with the rotation of the folding member 32 with respect to the rotation support member 33.

The rotation support member 33 may include: a mounting bracket 331 disposed between the fixing member 31 and the folding member 32; the fixing support member 332 coupled to the fixing member 31 and rotatably coupled to the mounting bracket 331 via the fixing support shaft 334; the folding support member 333 coupled to the folding member 32 and rotatably coupled to the mounting bracket 331 via the folding support shaft 335. In this case, it is preferable that the fixing support member 332 and the folding support member 333 are gear-coupled with each other.

The mounting bracket 331 may include a mounting rod 3311, and a mounting blade 3312 protruding from each end of the mounting rod 3311. The mounting rod 3311 may be provided with a blade flow groove 3313 into which the rotary blade 34, which will be described later, may be inserted. The fixing support shaft 334 and the folding support shaft 335 are coupled to the mounting blade.

The fixing support member 332 may include: a fixing gear 3321 rotatably coupled to the mounting blade 3312 of the mounting bracket 331 via the fixing support shaft 334; and a fixing rod protruding from the fixing gear 3321. Fixing gear 3321 teeth for gear combination are formed on the outer peripheral surface of the fixing gear 3321, and the fixing rod is coupled to the fixing support coupling portion 311 provided on the fixing member 31.

The folding support member 333 may include: a folding gear 3331 rotatably coupled to the mounting blade 3312 of the mounting bracket 331 via the folding support shaft 335; and a folding rod protruding from the folding gear 3331. Folding gear 3331 teeth that mesh with the fixing gear 3321 teeth are formed on the outer peripheral surface of the folding gear 3331, and the folding rod is coupled to the folding support coupling portion 321 provided on the folding member 32.

The jig module may further include the rotary blade 34 provided in a pair. The rotary blades 34 are spaced apart from each other to form symmetry, and are rotatably coupled to the rotation support member 33 via a blade shaft 342. The rotary blades 34 may be divided into a fixing blade rotatably coupled to the fixing support member 332 via a first shaft of the blade shaft 342, and a folding blade rotatably coupled to the folding support member 333 via a second shaft of the blade shaft 342.

The rotary blades 34 include a pair of blade bodies 341. The blade bodies 341 are formed long between the fixing member 31 and the folding member 32, and are rotatably coupled to a fixing frame 3322 and a folding frame 3332 of the rotation support member 33 via the blade shaft 342, respectively. The rotary blades 34 may further include at least one of: an idle stopper 343 protruding from each of the blade bodies 341 so as to be caught and supported by the fixing frame 3322 and the folding frame 3332 of the rotation support member 33 in the idle state with the flexible material unfolded (spread out); a blade support portion 344 provided on the side of each of the blade bodies 341 to be supported by the fixing blade stopper 314 or the folding blade stopper 324 as the folding of the flexible material is completed; and a blade positioning protrusion 345 protruding from the end of each of the rotary blades 34 so as to be inserted into and removed from the fixing positioning groove 313 and the folding positioning groove 323 according to the folding action of the flexible material.

In summary, the fixing positioning groove 313 may be formed recessed in one of the side of the fixing member 31 facing the folding member 32 and the rotary blade 34, and the folding positioning groove 323 may be formed recessed in one of the side of the folding member 32 facing the fixing member 31 and the rotary blade 34. Thus, in the remaining one of the side of the fixing member 31 facing the folding member 32 and the rotary blade 34, and in the remaining one of the side of the folding member 32 facing the fixing member 31 and the rotary blade 34, the blade positioning protrusion 345, which may be inserted into and removed from the fixing positioning groove 313 and the folding positioning groove 323 according to the folding action of the flexible material, is protrudingly formed.

Accordingly, after coupling the detachable base 41 to the fixing support coupling portion 311, the detachable base 41 to which the fixing member 31 is engaged is coupled to the base module 10 using the base detachment member 42. In addition, the folding member 32 is coupled to the interlocking member 24 of the folding module 20. Then, since the fixing member 31, the folding member 32, and the rotary blades 34 are arranged in parallel on the same plane, the flexible material is spread 180 degrees and coupled to the jig module 30.

Figure 8:
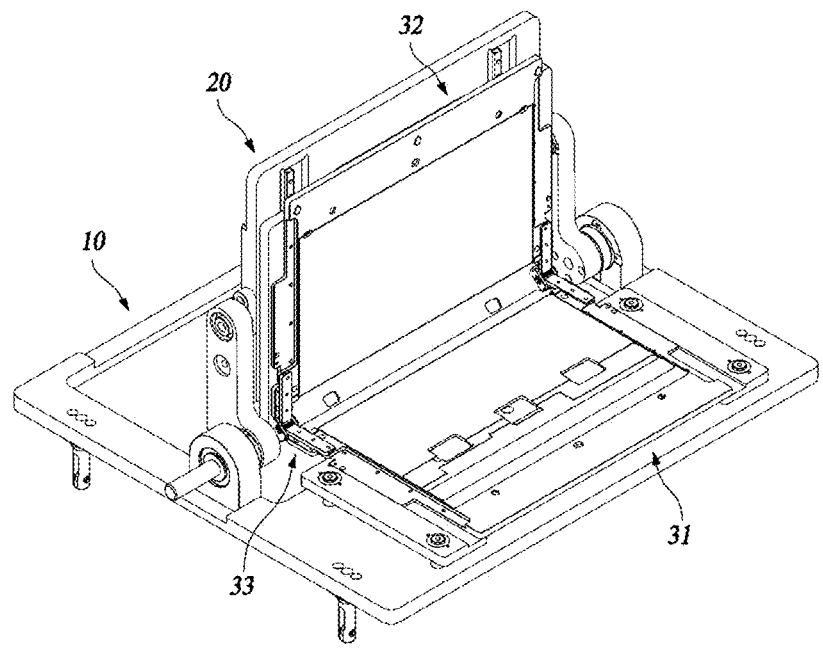
FIG. 8 is a perspective view showing a first folding state of a stress-free folding mechanism according to an embodiment of the present disclosure, in which (a) shows a flexible material folded at 90 degrees, and (b) shows a jig module folded at 90 degrees.
Figure 8:
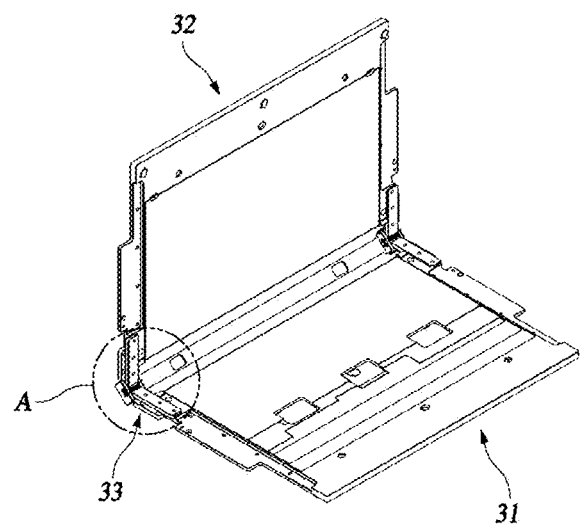
Figure 9:
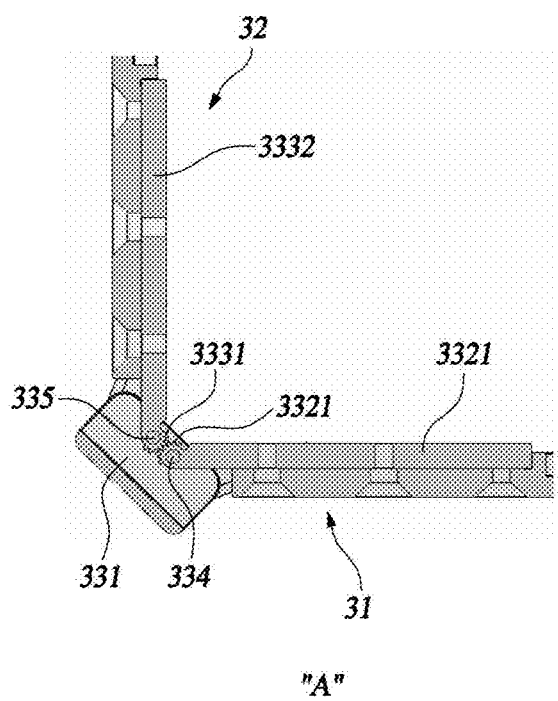
FIG. 9 is an enlarged cross-sectional view of portion "A" in FIG. 8.
Figure 10:
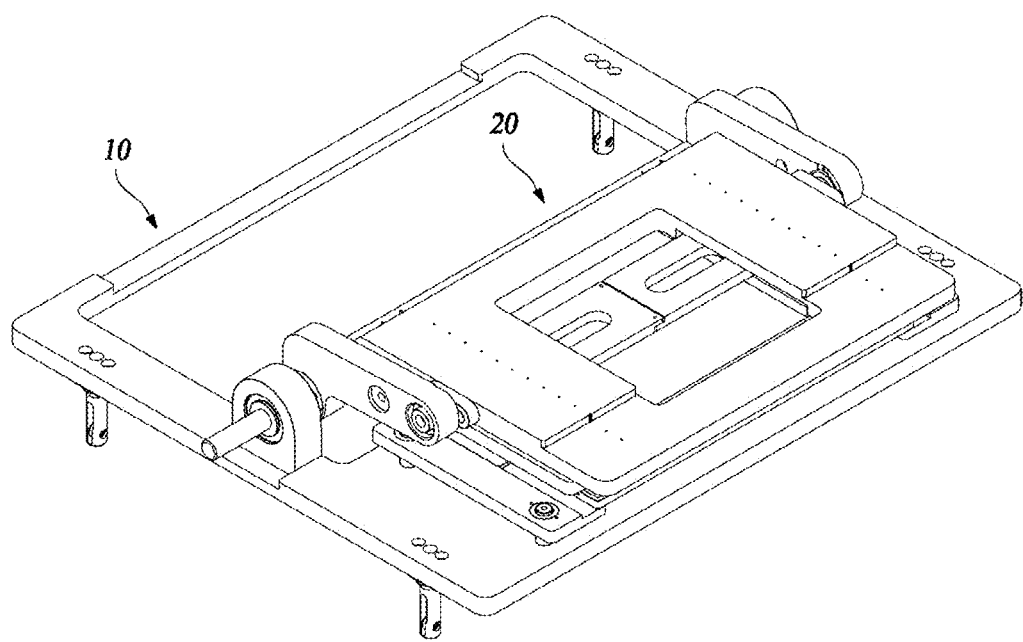
FIG. 10 is a perspective view showing a first folding state of a stress-free folding mechanism according to an embodiment of the present disclosure, in which (a) shows a flexible material folded at 0 degrees, and (b) shows a jig module folded at 0 degrees.
Figure 10:
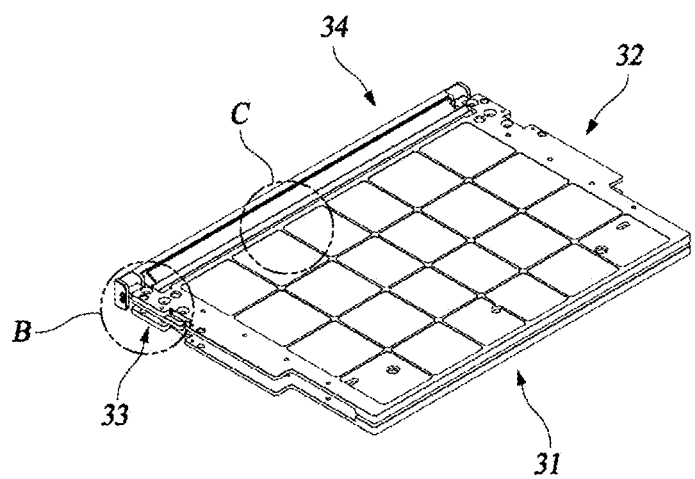
Figure 11:
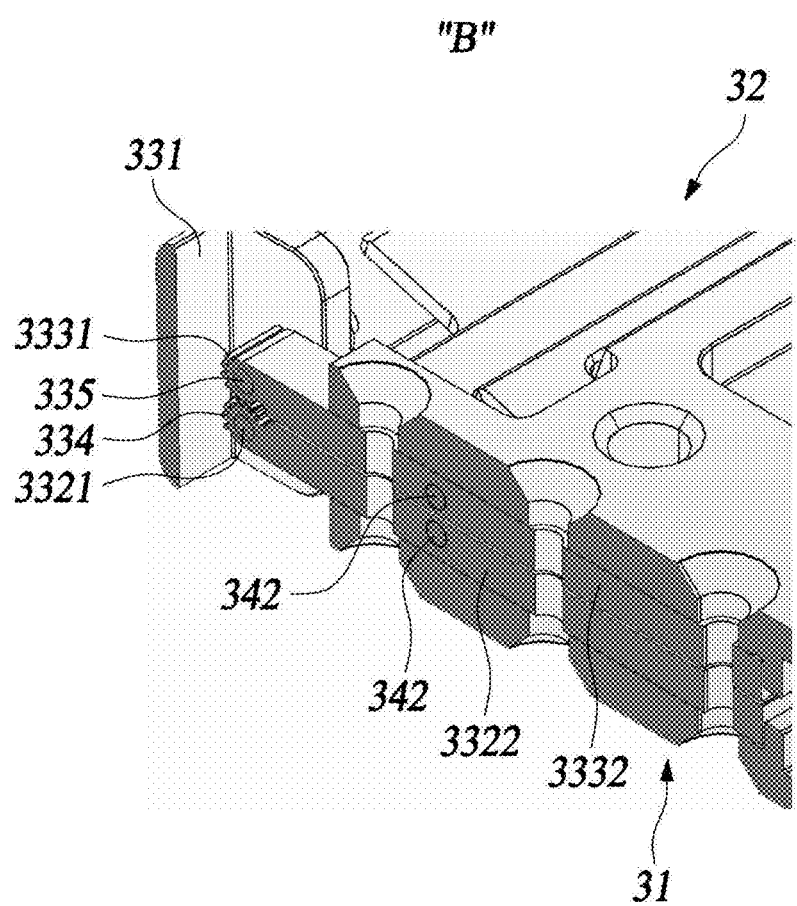
FIG. 11 an enlarged cross-sectional view of portion "B" in FIG. 10.
Figure 12:
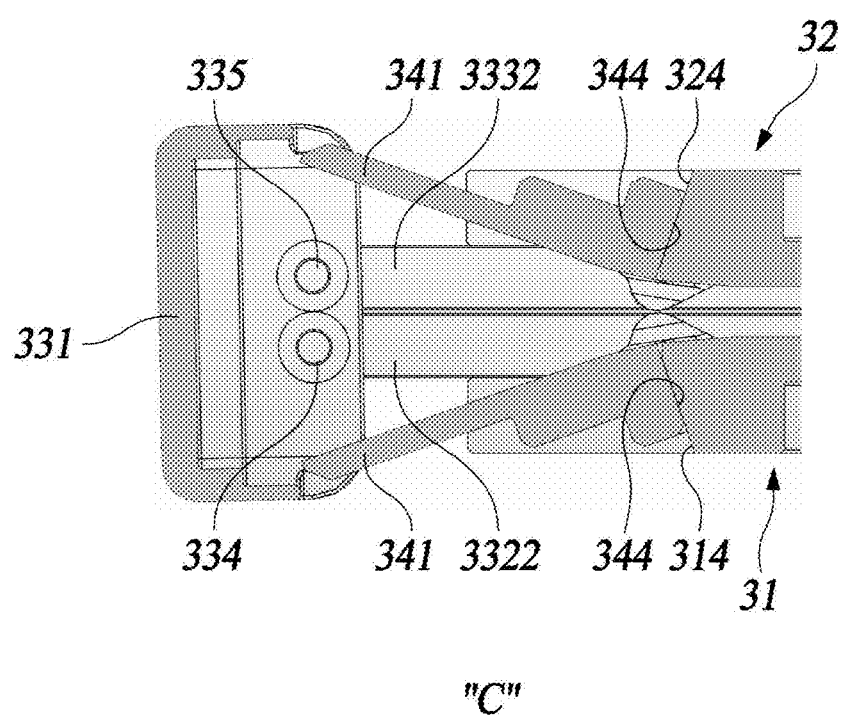
FIG. 12 is an enlarged cross-sectional view of portion "C" in FIG. 10.

When the folding module 20 is rotated 180 degrees in a state in which the fixing member 31 and the folding member 32 are arranged in parallel as shown in FIG. 1, the folding member 32 is arranged at 90 degrees with respect to the fixing member 31 as shown in FIGS. 8 and 9, and afterwards, a 0-degree state is shown in which the fixing member 31 and the folding member 32 overlap in parallel as shown in FIGS. 10 to 12. At this time, as the folding member 32 rotates with respect to the fixing member 31, the rotational drive member rotates with respect to the base module 10, the folding member 32 rotates with respect to the pivoting driving member 22, and the interlocking member 24 slides based on the folding member 32, the movement trajectory of the folding main body 21 and the movement trajectory of the interlocking member 24 create a smooth curved trajectory, which may prevent stress from acting on the flexible material.

When the folding of the flexible material is completed, the fixing member 31 and the folding member 32 are parallel while facing each other as shown in FIG. 12, the pair of rotary blades 34 spread outward toward the mounting bracket 331, so that the area where the flexible material is bent takes on a water drop shape.

According to the stress-free folding mechanism mentioned above, in conducting a folding endurance test of flexible materials, stress acting on a flexible material being folded may be minimized or stress may be prevented from being applied to a flexible material being folded. In addition, the folding action of a flexible material may be clearly implemented. In addition, when implementing the folding action of a flexible material, a sliding method and a rotating method are used in parallel, so that the movement trajectory of the folding main body 21 and the movement trajectory of the interlocking member 24 create a smooth curved trajectory, preventing stress from occurring in the flexible material.

Furthermore, according to the stress-free folding mechanism, by smoothing the rotational movement of the folding bracket 221 based on the base module 10 and smoothing the rotational movement of the folding main body 21 based on the folding bracket 221, a curved trajectory may be created stably.

Furthermore, according to the stress-free folding mechanism, the rotational movement of the folding bracket 221 may be clearly implemented based on the base module 10.

Furthermore, according to the stress-free folding mechanism, the rotational movement of the folding main body 21 may be clearly implemented based on the folding bracket 221.

Furthermore, according to the stress-free folding mechanism, the slide movement of the interlocking member 24 may be performed smoothly based on the folding main body 21. In addition, by modularizing the multiple interlocking sliders 243, the slide movement of the interlocking member 24 may be clearly performed based on the folding main body 21 and the clearance due to slide movement may be minimized.

Furthermore, according to the stress-free folding mechanism, it is easy to install a flexible material and the folding action of the flexible material may be clearly implemented.

Furthermore, according to the stress-free folding mechanism, the jig module 30 may be replaced in various ways depending on the type of flexible material or test type. In addition, the jig module 30 may be easily attached to and detached from the base module.

Furthermore, according to the stress-free folding mechanism, the jig module 30 may be positioned correctly on the base module 10.

Furthermore, according to the stress-free folding mechanism, the jig module 30 may be stably combined with the base module 10 and the folding module 20, the folding action of a flexible material may be clearly implemented according to the operation of the folding module 20, and stress acting on the flexible material may be suppressed or prevented.

Furthermore, according to the stress-free folding mechanism, the linked operation of the fixing member 31, the folding member 32, and the rotation support member 33 may be facilitated, and as the fixing member 31, the folding member 32, and the rotation support member 33 rotate in conjunction with each other, stress acting on a flexible material may be suppressed or prevented.

Furthermore, according to the stress-free folding mechanism, the linked rotation of the mounting bracket 331, the fixing support member 332, and the folding support member 333 is made clear, and when a flexible material is folded, stress may be suppressed or prevented from being applied to the flexible material.

Furthermore, according to the stress-free folding mechanism, when a flexible material is folded, the area where the flexible material is bent may be supported to form a water drop shape, and the flexible material may be protected by covering the area where the flexible material is bent. In addition, as the folding of a flexible material is completed, it is possible to ensure that parts of the flexible material facing each other are parallel and close to each other, and the thickness after folding is completed may be reduced. In addition, a bending trace may be minimized in the area where a flexible material is bent, and when a flexible material is unfolded, the flatness of the flexible material may be improved and the surface of the flexible material may be smoothed.

Furthermore, according to the stress-free folding mechanism, when a flexible material is unfolded, the fixing member 31, the folding member 32, and the rotary blades 34 may be arranged flat on the same plane, and the unfolded state of the flexible material may be maintained flat.

Furthermore, according to the stress-free folding mechanism, as the folding of a flexible material is completed, a water drop shape in the area where the flexible material is bent may be maintained stably and deformation of the area where the flexible material is bent may be prevented.

Furthermore, according to the stress-free folding mechanism, the individual movements of the fixing member 31, the folding member 32, and the rotary blades 34 may be made clear, and the rotary blades 34 may be correctly positioned between the fixing member 31 and the folding member 32.

What is claimed is:

1. A stress-free folding mechanism comprising:
   a base module; and
   a folding module rotatably coupled to the base module, wherein the folding module is configured to mount a flexible material thereto,
   wherein the folding module comprises:
      a folding main body disposed spaced apart from the base module;
      a rotational drive member, a first end of which is rotatably coupled to the base module and a second end of which is rotatably coupled to the folding main body; and
      an interlocking member slidably coupled to the folding main body via a sliding member, and
   wherein the rotational drive member comprises:
      a folding bracket configured to be rotated with respect to the base module;
      a folding mounting module that rotatably couples a first end of the folding bracket and the base module to allow the folding bracket to rotate about the folding mounting module; and
      a rotational mounting module that rotatably couples a second end of the folding bracket and the folding main body to allow a rotation of the folding bracket to cause the folding main body to rotate.

2. The folding mechanism of claim 1, wherein the base module is provided with a folding support bracket, and
   wherein the folding mounting module comprises:
      a folding hole portion provided in one of the first end of the folding bracket and the folding support bracket;
      a folding shaft portion coupled to the remaining one of the first end of the folding bracket and the folding support bracket; and
      a folding bearing fit-coupled to the folding hole portion and rotatably coupled to the folding shaft.

3. The folding mechanism of claim 1, wherein the rotational mounting module comprises:
   a rotational hole portion provided in one of the second end of the folding bracket and the folding main body;
   a rotational shaft portion coupled to the remaining one of the second end of the folding bracket and the folding main body via a rotational bracket; and
   a rotational bearing fit-coupled to the rotational hole portion and rotatably coupled to the rotational shaft portion.

4. The folding mechanism of claim 1, further comprising:
   a jig module coupled to the folding module while coupled to the base module so that the flexible material is mounted.

5. The folding mechanism of claim 4, further comprising:
   a jig detachment module that attaches and detachably couples the jig module to the base module.

6. The folding mechanism of claim 5, wherein the jig module is provided with a fixing jig coupling portion, and
   wherein the jig detachment module comprises:
      a detachable base provided with a member positioning portion where the fixing jig coupling portion is correctly positioned; and
      a base detachment member that detachably couples the detachable base to the base module.

7. The folding mechanism of claim 4, wherein the jig module comprises:
   a fixing member coupled to the base module so that a first side of the flexible material is supported;
   a folding member disposed spaced apart from the fixing member and coupled to the folding module so that a second side of the flexible material is supported; and
   a rotation support member connecting mutually adjacent ends of the fixing members and the folding member.

8. The folding mechanism of claim 7, wherein the rotation support member comprises:
   a fixing support shaft that forms a center of rotation of the rotation support member based on the fixing member; and
   a folding support shaft that is spaced apart from the fixing support shaft and that forms a center of rotation of the folding member based on the rotation support member, and
   wherein the rotation support member rotates based on the fixing member in conjunction with the rotation of the folding member based on the rotation support member when the folding member is folded relative to the fixing member.

9. The folding mechanism of claim 8, wherein the rotation support member comprises:
   a mounting bracket disposed between the fixing member and the folding member;
   a fixing support member coupled to the fixing member and rotatably coupled to the mounting bracket via the fixing support shaft; and
   a folding support member coupled to the folding member and rotatably coupled to the mounting bracket via the folding support shaft,
   wherein the fixing support member and the folding support member are gear-coupled with each other.

10. The folding mechanism of claim 7, wherein the jig module further comprises:
    a rotary blade provided in a pair, so that the rotary blades are spaced apart from each other to form symmetry, and rotatably coupled to the rotation support member.

11. The folding mechanism of claim 10, wherein the rotary blades each provided with an idle stopper that is caught and supported by the rotation support member in an idle state in which the flexible material is spread out.

12. The folding mechanism of claim 10, wherein on a side of the fixing member facing the folding member, a fixing blade stopper is provided to prevent rotation of the rotary blades as a folding of the flexible material is completed,
    wherein on a side of the folding member facing the fixing member, a folding blade stopper is provided to prevent the rotation of the rotary blades as the folding of the flexible material is completed, and
    wherein the fixing blade stopper and the folding blade stopper are symmetrical to each other.

13. The folding mechanism of claim 12, wherein on a side of each of the rotary blades, a blade support portion is provided to be supported by the fixing blade stopper or the folding blade stopper as the folding of the flexible material is completed.

14. The folding mechanism of claim 10, wherein a fixing positioning groove is formed recessed in one of a side of the fixing member facing the folding member or the rotary blades,
    wherein a folding positioning groove is formed recessed in one of a side of the folding member facing the fixing member or the rotary blades, and
    wherein in the remaining one of the side of the fixing member facing the folding member or the rotary blades, and in the remaining one of the side of the folding member facing the fixing member or the rotary blades, a blade positioning protrusion, which may be inserted into and removed from the fixing positioning groove or the folding positioning groove according to the folding action of the flexible material, is protrudingly formed.

\* \* \* \* \*